(12) United States Patent
Song et al.

(10) Patent No.: US 12,497,298 B2
(45) Date of Patent: Dec. 16, 2025

(54) METHOD FOR PREPARING MODIFIED GRAPHITE, SECONDARY BATTERY, BATTERY MODULE, BATTERY PACK AND POWER CONSUMING DEVICE

(71) Applicant: CONTEMPORARY AMPEREX TECHNOLOGY (HONG KONG) LIMITED, Hong Kong (CN)

(72) Inventors: Zilong Song, Ningde (CN); Rui Shen, Ningde (CN); Libing He, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 666 days.

(21) Appl. No.: 17/942,080

(22) Filed: Sep. 9, 2022

(65) Prior Publication Data

US 2023/0183073 A1 Jun. 15, 2023

Related U.S. Application Data

(63) Continuation of application No. PCT/CN2021/115840, filed on Aug. 31, 2021.

(51) Int. Cl.
*C01B 32/205* (2017.01)
*H01M 4/02* (2006.01)
(Continued)

(52) U.S. Cl.
CPC .......... *C01B 32/205* (2017.08); *H01M 4/133* (2013.01); *H01M 4/587* (2013.01);
(Continued)

(58) Field of Classification Search
CPC ............... H01M 4/133; H01M 4/1393; H01M 4/583–587; C01B 32/205; C01B 32/20–23
See application file for complete search history.

(56) References Cited

U.S. PATENT DOCUMENTS

2009/0242830 A1* 10/2009 Mao ...................... H01M 4/366
                                                           252/182.1
2018/0013146 A1*  1/2018 Yamada ................ H01M 4/587
2021/0313575 A1* 10/2021 Shen ..................... H01M 4/133

FOREIGN PATENT DOCUMENTS

CN          106299373 A        1/2017
CN          107221674 A        9/2017
(Continued)

OTHER PUBLICATIONS

Japan Patent Office (JPO) The Notice of Reasons for Refusal For JP Application No. 2022-553132 Nov. 28, 2023 8 Pages (Translation Included).
(Continued)

*Primary Examiner* — Robert S Carrico
(74) *Attorney, Agent, or Firm* — ANOVA LAW GROUP, PLLC

(57) ABSTRACT

A method for preparing a modified graphite includes performing crushing on coal-based needle coke to obtain a first material, performing shaping fine powder removal on the first material to obtain a second material, performing heat treatment on the second material in a reaction kettle and then cooling the second material after the heat treatment to room temperature to obtain a third material, and performing graphitization on the third material in a graphitization furnace and then cooling the third material after the graphitization to room temperature to obtain the modified graphite.

6 Claims, 6 Drawing Sheets

(51) Int. Cl.
  *H01M 4/133* (2010.01)
  *H01M 4/587* (2010.01)
  *H01M 10/052* (2010.01)
  *H01M 10/0525* (2010.01)

(52) U.S. Cl.
  CPC ..... *H01M 10/052* (2013.01); *H01M 10/0525* (2013.01); *H01M 2004/027* (2013.01)

(56) References Cited

FOREIGN PATENT DOCUMENTS

| | | | |
|---|---|---|---|
| CN | 107579252 A | 1/2018 | |
| CN | 109621893 A | 4/2019 | |
| CN | 109704323 A | 5/2019 | |
| CN | 109704324 A | 5/2019 | |
| CN | 110718690 A | 1/2020 | |
| CN | 112812796 A | 5/2021 | |
| CN | 113226986 A | 8/2021 | |
| JP | 2001023638 A | 1/2001 | |
| KR | 20140024369 A | 2/2014 | |
| WO | WO-2021108983 A1 * | 6/2021 | ........... C01B 32/205 |

OTHER PUBLICATIONS

The World Intellectual Property Organization (WIPO) International Search Report and Written opinion for PCT/CN2021/115840 May 25, 2022 20 pages (including English translation).

The European Patent Office (EPO) Extended Search Report for EP Application No. 21928350.4 Jun. 01, 2023 7 Pages.

The Korean Intellectual Property Office Notice of Allowance for Application No. 10-2022-7030833 Mar. 26, 2025 3 Pages (including translation).

* cited by examiner

METHOD FOR PREPARING MODIFIED GRAPHITE, SECONDARY BATTERY, BATTERY MODULE, BATTERY PACK AND POWER CONSUMING DEVICE

CROSS-REFERENCE TO RELATED APPLICATION

This application is a continuation of International Application No. PCT/CN2021/115840, filed on Aug. 31, 2022, the entire content of which is incorporated herein by reference.

TECHNICAL FIELD

The present application relates to the technical field of lithium batteries, and in particular to a modified graphite, a secondary battery, a battery module, a battery pack and a power consuming device.

BACKGROUND ART

In recent years, with the increasing application range, lithium-ion secondary batteries are widely used in energy storage power systems such as hydraulic power, thermal power, wind power and solar power stations, as well as many fields such as electric tools, electric bicycles, electric motorcycles, electric vehicles, military equipment, and aerospace. Due to the great development of lithium-ion secondary batteries, higher requirements have also been placed on the lithium-ion secondary batteries in terms of energy density, cycling performance, safety performance, etc. Graphite has become the first choice of modified graphite for commercial lithium-ion secondary batteries due to the low costs, convenient production, and practical capacity close to the theoretical capacity.

Graphite is usually used as a negative electrode material and includes natural graphite, synthetic graphite, etc.; however, the synthetic graphite usually has highly active defects on the surface which is prone to a side reaction with an electrolyte, resulting in the consumption of active lithium; and the loss of the active lithium ions reduces the cycling performance of the lithium-ion secondary batteries and impairs the service life of the lithium-ion secondary batteries. Therefore, there is still a need to improve the existing modification technologies for synthetic graphite.

SUMMARY

Technical Problem to be Solved

In view of the above-mentioned problems, an object of the present application is to provide a method for preparing a modified graphite to enable a secondary battery containing the modified graphite to have a relatively high energy density and relatively good cycling performance and safety performance.

In order to achieve the above object, the present application provides a method for preparing a modified graphite, a secondary battery, a battery module, a battery pack and a powered device.

Technical Solutions for Solving Problems

A first aspect of the present application provides a method for preparing a modified graphite, the method involving:
a crushing step: crushing coal-based needle coke to obtain a material A;
a shaping step: shaping the material A and removing the fine powder to obtain a material B;
a heat treatment step: placing the material B in a reaction kettle for a heat treatment and then cooling same to room temperature to obtain a material C; and
a graphitization step: placing the material C in a high-temperature graphitization furnace for high-temperature graphitization and then cooling same to room temperature to obtain a product, i.e., the modified graphite.

Therefore, in the present application, by selecting coal-based needle coke containing volatile matter as a precursor and by means of a closed heat treatment, the volatile matter contained in the coal-based needle coke is escaped and enriched on the surface of the coal-based needle coke precursor, causing the surface of the coal-based needle coke precursor to be uniformly coated, i.e., self-coated before graphitization. After graphitization, the obtained modified graphite has a coating layer, and when used as a negative electrode material, the initial Coulombic efficiency of a secondary battery can be improved. Although the mechanism remains quite unclear, it is speculated that the coating layer thereof reduces the surface roughness of the modified graphite, repairs the surface defects of the modified graphite, and makes the numerical value of the specific surface area BET thereof within an appropriate range.

The coal-based needle coke is obtained by the pyrolysis of coal pitch. Coal pitch is a complex mixture containing a large amount of condensed cyclic aromatic hydrocarbons, with a suitable intermolecular force. Compared with petroleum pitch, coal pitch has a high degree of aromaticity and a high carbon yield. Therefore, coal tar pitch is an ideal raw material for the synthesis of high-quality needle coke. In a method for preparing coal-based needle coke, coal pitch is usually pretreated and then subjected to delayed coking and high-temperature calcination to finally obtain coal-based needle coke. Examples of the coal-based needle coke include coke from Shin Nihon Chemical, Mitsubishi Coke, Anshan Coke, etc.

In any embodiment, the coal-based needle coke satisfies, in mass percentages, a volatile matter content of 5-9%, optionally 6-8%, a sulfur content of less than or equal to 0.2%, optionally less than or equal to 0.1%, an ash content of less than or equal to 0.2%, optionally less than or equal to 0.1%, and a quinoline-insoluble matter content of less than or equal to 0.2%, optionally less than or equal to 0.1%. The true density is 1.35-1.48 g/cm$^3$, optionally 1.39-1.45 g/cm$^3$. Therefore, in the present application, by selecting coal-based needle coke with specific components as a raw material, in which volatile matter contained in itself can be used as a coating agent, a coating layer can be formed on the surface without the need to add an additional coating agent, and when it is used as a negative electrode material, the interfacial performance of the negative electrode material can be improved. The volatile matter refers to a part of liquid (in a steam state at this point) and gaseous products with smaller molecular weights that are decomposed due to thermal decomposition of organic substances in the coal-based needle coke. The ash content refers to inorganic substances (such as iron oxides and silicon oxides) that remain after the coal-based needle coke is fired in an air or oxygen atmosphere.

In any embodiment, in the heat treatment step, the heat treatment temperature is 400-800° C., optionally 500-700° C.; and the constant temperature time is 2-8 hours, optionally 3-6 hours. Therefore, in the present application, by selecting the heat treatment temperature and constant temperature time within the ranges mentioned above, the volatile matter in the coal-based needle coke can be escaped and fully melt to form a uniform coating layer on the particle surface.

In any embodiment, in the heat treatment step, the temperature increase rate is 1-15° C./min, optionally 5-12° C./min. Therefore, in the present application, by selecting the temperature increase rate within the range mentioned above, the coal-based needle coke can be heated up at a constant rate, and the volatile matter can slowly spill out and evenly adhere to the particle surface to form a coating layer.

In any embodiment, in the graphitization step, the graphitization temperature is 2500-3200° C.; and the graphitization temperature holding time is 55-65 hours. Therefore, in the present application, the selection of the graphitization temperature and graphitization temperature holding time within the ranges mentioned above results in a good graphitization degree, and when it is used as a negative electrode material, the prepared secondary battery has an excellent initial Coulombic efficiency and cycling performance.

In any embodiment, in the shaping step, material B needs to satisfy Dv50=5-12 μm, optionally 8-11 μm, and 5 μm≥Dn10≥1.5 μm, optionally 5 μm≥ Dn10≥2.0 μm. Therefore, in the present application, the selection of material B with the above-mentioned particle size facilitates the treatment of the subsequent process, and as such, the obtained modified graphite has an excellent electrochemical performance.

In any embodiment, in the crushing step, material A satisfies Dv50=3-12 μm, optionally Dv50=6-9 μm. Therefore, in the present application, by crushing the raw material into the above-mentioned particle size, the convenience of subsequent processing is ensured, and the prepared negative electrode material has a good electrochemical performance.

A second aspect of the present application provides a modified graphite prepared according to the method of the first aspect of the present application.

A third aspect of the present application provides a negative electrode plate comprising the modified graphite of the second aspect of the present application.

A fourth aspect of the present application provides a secondary battery comprising the negative electrode piece of the third aspect of the present application.

A fifth aspect of the present application provides a battery module comprising the secondary battery of the fourth aspect of the present application.

A sixth aspect of the present application provides a battery pack comprising the battery module of the fifth aspect of the present application.

A seventh aspect of the present application provides a power consuming device comprising at least one selected from the secondary battery of the fourth aspect of the present application, the battery module of the fifth aspect of the present application, or the battery pack of the sixth aspect of the present application.

Effects of the Disclosure

The present application provides a method for preparing a modified graphite, a negative electrode plate, a secondary battery, a battery module, a battery pack, and a power consuming device. By selecting coal-based needle coke, as a raw material, which contains a certain content of volatile matter, and by means of the closed heat treatment of the coal-based needle coke before graphitization, the volatile matter contained in the coal-based needle coke is escaped and enriched on the surface of the precursor, such that the surface of the precursor is uniformly coated, i.e., self-coated before graphitization. After graphitization, the obtained modified graphite has a coating layer, which reduces the surface roughness of the modified graphite, repairs the surface defects of the modified graphite, and reduces the consumption of active lithium ions by the modified graphite and side reactions with the electrolyte solution, thereby improving the initial Coulombic efficiency of the secondary battery comprising the modified graphite and thus providing a better cycling performance and service life.

LIST OF REFERENCE SIGNS

Figure 1:
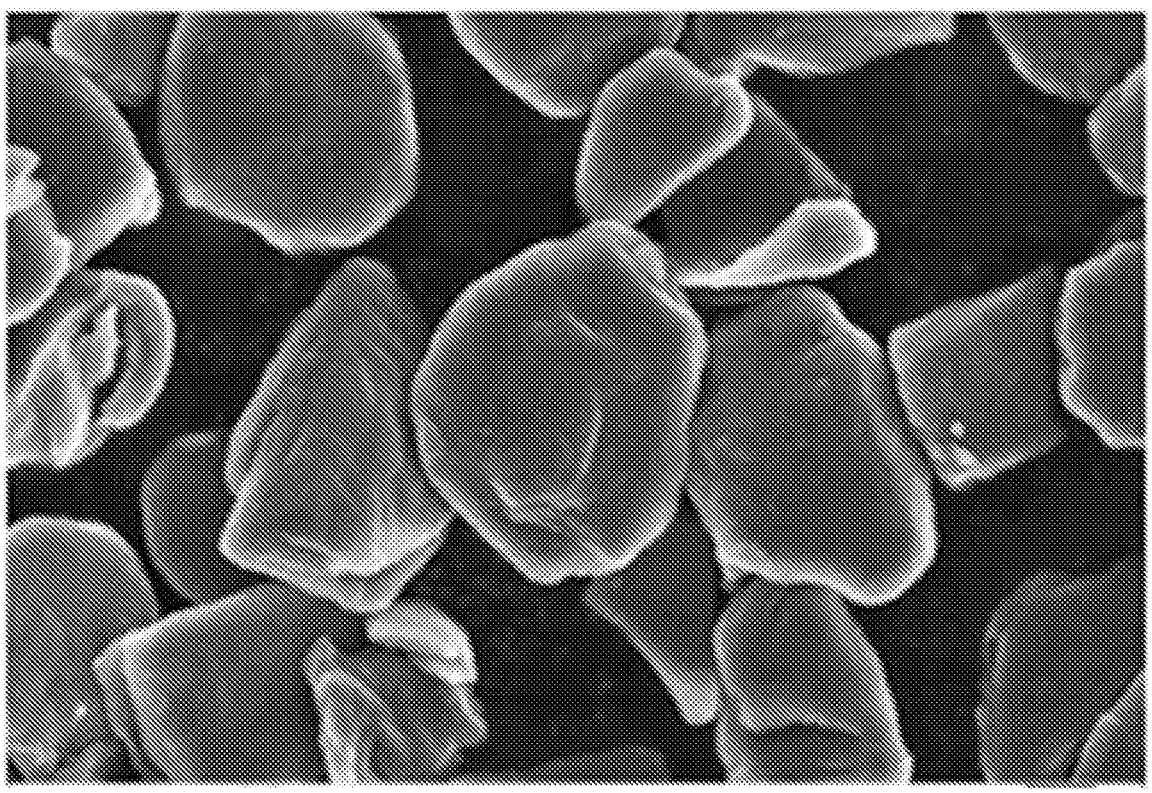
FIG. 1 is a scanning electron microscope image of the modified graphite of the present application.

1 Battery pack; 2 upper casing body; 3 lower casing body; 4 battery module; 5 secondary battery; 51 housing; 52 electrode assembly; and 53 top cover assembly

DETAILED DESCRIPTION OF EMBODIMENTS

Hereinafter, embodiments of the modified graphite and the preparation method therefor, the negative electrode piece, the secondary battery, the battery module, the battery pack, and the powered device of the present application are described in detail and specifically disclosed with reference to the accompanying drawings as appropriate. However, there are some cases in which unnecessary detailed descriptions are omitted. For example, there are cases in which detailed descriptions of well-known matters or repeated descriptions of actual identical structures are omitted. This is to prevent the following description from becoming unnecessarily lengthy and to facilitate understanding by those skilled in the art. In addition, the accompanying drawings and the following description are provided for those skilled in the art to fully understand the present application, and are not intended to limit the subject matter set forth in the claims.

The "ranges" disclosed in the present application are defined in the form of lower and upper limits. A given range is defined by the selection of a lower limit and an upper limit, and the selected lower and upper limits define the boundaries of the particular range. The ranges defined in this manner may or may not include end values, and may be arbitrarily combined, that is, any lower limit may be combined with any upper limit to form a range. For example, if the ranges 60-120 and 80-110 are listed for a particular parameter, it is to be understood that the ranges 60-110 and 80-120 are also contemplated. In addition, if the minimum range values 1 and 2 are listed and if the maximum range values 3, 4, and 5 are listed, the following ranges can all be contemplated: 1-3, 1-4, 1-5, 2-3, 2-4 and 2-5. In the present application, unless stated otherwise, the numerical range "a-b" represents an abbreviated representation of any combination of real numbers between a and b, wherein a and b are both real numbers. For example, the numerical range "0-5" means that all the real numbers between "0-5" have been listed herein, and "0-5" is merely an abbreviated representation of the combination of these numerical values. In addition, when a parameter is expressed as an integer greater than or equal to 2, it is equivalent to disclose that the parameter is, for example, an integer of 2, 3, 4, 5, 6, 7, 8, 9, 10, 11, 12, etc.

All the embodiments and optional embodiments of the present application can be combined with one another to form new technical solutions, unless otherwise stated.

All the technical features and optional technical features of the present application can be combined with one another to form a new technical solution, unless otherwise stated.

Unless otherwise stated, all the steps in the present application can be performed sequentially or randomly, and in some embodiments, sequentially. For example, the method including steps (a) and (b) indicates that the method may include steps (a) and (b) performed sequentially, or may also include steps (b) and (a) performed sequentially. For example, reference to "the method may further include step (c)", indicating that step (c) may be added to the method in any order, e.g., the method may include steps (a), (b) and (c), steps (a), (c) and (b), and also steps (c), (a) and (b), etc.

The terms "comprise" and "include" mentioned in the present application are open-ended or closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B." In more particular, the condition "A or B" is satisfied by any one of the following conditions: A is true (or present) and B is false (or not present); A is false (or not present) and B is true (or present); or both A and B are true (or present).

Preparation of Modified Graphite

In one embodiment of the present application, the present application proposes a method for preparing a modified graphite, the method involving:

a crushing step: crushing coal-based needle coke to obtain the material A;

a shaping step: shaping the material A and removing the fine powder to obtain a material B;

a heat treatment step: placing the material B in a reaction kettle for a heat treatment and then cooling same to room temperature to obtain a material C; and a graphitization step: placing the material C in a graphitization furnace for graphitization and then cooling same to room temperature to obtain a product, i.e., the negative electrode material.

The coal-based needle coke is obtained by the pyrolysis of coal pitch. Coal pitch is a complex mixture containing a large amount of condensed cyclic aromatic hydrocarbons, with a suitable intermolecular force. Compared with petroleum pitch, coal pitch has a high degree of aromaticity and a high carbon yield. Therefore, coal tar pitch is an ideal raw material for the synthesis of high-quality needle coke. In a method for preparing coal-based needle coke, coal pitch is usually pretreated and then subjected to delayed coking and high-temperature calcination to finally obtain coal-based needle coke. Examples of the coal-based needle coke include coke from Shin Nihon Chemical, Mitsubishi Coke, Anshan Coke, etc.

Although the mechanism remains unclear, the applicant has unexpectedly found that by selecting coal-based needle coke containing a certain amount of volatile matter as a precursor and by means of a closed heat treatment, the volatile matter is escaped and enriched on the surface of the precursor, causing the surface of the precursor to be uniformly coated, i.e., self-coated before graphitization. After graphitization, the obtained modified graphite has a coating layer. FIG. 1 is a scanning electron microscope image of the prepared modified graphite. In the figure, the modified graphite has a smooth and flat particle surface, which proves that the coating layer effectively reduces the surface roughness of the modified graphite, repairs the surface defects of the modified graphite, reduces side reactions between the surface of the modified graphite and the electrolyte solution, and achieves the purpose of improving the initial Coulombic efficiency thereof.

In some embodiments, the coal-based needle coke satisfies, in mass percentages, a volatile matter content of 5-9%, optionally 6-8%, a sulfur content of less than or equal to 0.2%, optionally less than or equal to 0.1%, an ash content of less than or equal to 0.2%, optionally less than or equal to 0.1%, a quinoline-insoluble matter content of less than or equal to 0.2%, optionally less than or equal to 0.1%, and a true density of 1.35-1.48 g/cm$^3$, optionally 1.39-1.45 g/cm$^3$. With coal-based needle coke as a precursor and volatile components contained in itself as a coating agent, a coating layer can be formed on the surface thereof without the need to add an additional coating agent, thereby modifying defects on the particle surface and reducing the roughness of the particle surface. The modified graphite modified with the coating layer reduces the consumption of active lithium ions, thereby improving the initial Coulombic efficiency. In addition, the true density of the precursor has a certain influence on the tap density of the prepared modified graphite. Therefore, by selecting coal-based needle coke with a true density within the above range as a precursor, the prepared modified graphite also has a better tap density, thereby improving the energy density of a secondary battery in which the modified graphite is used.

In some embodiments, in the heat treatment step, the heat treatment temperature is 400-800° C., optionally 500-700° C.; and the constant temperature time is 2-8 hours, optionally 3-6 hours. The heat treatment temperature and constant temperature time are crucial for the formation of the coating layer of the modified graphite. By means of the heat treatment temperature within the above-mentioned range, the following situations can be avoided: if the heat treatment temperature is too low and the constant temperature time is too short, the volatile matter in the coal-based needle coke may not fully melt and spill out to form a coating layer on the particle surface, and therefore, the effect of modifying the surface defects of the particles may be lost; and if the heat treatment temperature is too high and the constant temperature time is too long, the energy consumption during the production process may be too high, causing increased production costs and unnecessary waste. That is to say, the heat treatment temperature and constant temperature time within the ranges mentioned above enable the volatile matter in the coal-based needle coke to spill out and fully melt to form a uniform coating layer on the particle surface, thereby reducing the consumption of active lithium ions and thus improving the initial Coulombic efficiency; in addition, there are no additional production costs caused by high energy consumption.

In some embodiments, in the heat treatment step, the temperature increase rate is 1-15° C./min, optionally 5-12° C./min. If the above heat treatment temperature falls within the above range, the following situations can be avoided: the temperature increase rate is too fast, which may cause the volatile matter in the coal-based needle coke to quickly spill out in a short time when the heat treatment temperature is reached, such that the volatile matter cannot uniformly coat the particle surface and at the same time cause particle agglomeration. That is to say, at the temperature increase rate within the above-mentioned range, the coal-based needle coke can be heated evenly and at a constant rate, the volatile matter can be uniformly and slowly attached to the particle surface to form a coating layer, and the correspondingly prepared modified graphite also has a high initial Coulombic efficiency and thus a good cycling performance.

In some embodiments, in the graphitization step, the graphitization temperature is 2500-3200° C.; and the graphitization temperature holding time is 55-65 hours. The graphitization temperature and graphitization temperature holding time within the above-mentioned ranges make the modified graphite prepared by this method have a good graphitization degree, and a good interlayer spacing facilitates the intercalation and deintercalation of lithium ions, thereby improving the initial Coulombic efficiency and cycling performance of the modified graphite.

In some embodiments, in the heat treatment step, material B needs to satisfy Dv50=5-12 μm, optionally 8-11 μm; and and 5 μm≥Dn10≥1.5 μm, optionally 5 μm≥ Dn10≥2.0 μm. The selection of material B with the above-mentioned particle size facilitates the treatment of the subsequent process, and the obtained modified graphite has a high tap density and an excellent electrochemical performance.

In some embodiments, in the crushing step, material A satisfies: Dv50=3-12 μm, optionally Dv50=6-9 μm. Crushing the raw material into the above-mentioned particle size ensures that when the raw material is subjected to a heat treatment and graphitization, the raw material is evenly and fully heated and has a uniform particle size distribution, and the prepared modified graphite has a uniform particle size distribution, a complete coating layer, and a high graphitization degree; furthermore, when used as a negative electrode material, the modified graphite results in a high initial Coulombic efficiency and a good cycling performance.

In addition, the volatile matter content of the coal-based needle coke can be tested by a method known in the art. For example, see YB/T5189-2007 for determination.

The sulfur content of the coal-based needle coke can be tested by a method known in the art, for example, see GB/T 2286-2008 for determination.

The ash content of the coal-based needle coke can be tested by a method known in the art, for example, see GB/T 1429-2009 for determination.

The quinoline-insoluble matter refers to the components in the coal-based needle coke that are insoluble in quinolines, and the quinoline-insoluble matter content of the coal-based needle coke can be tested by a method known in the art, for example, see GB/T2293-97 for determination.

The average volume distribution particle size Dv50 refers to the corresponding particle size when the cumulative volume distribution percentage of the modified graphite reaches 50%. In the present disclosure, the volume average particle size Dv50 of the modified graphite can be determined by a laser diffraction particle size analysis method. For example, the determination can be made with reference to the standard GB/T 19077-2016 using a laser particle size analyzer (e.g., Malvern Master Size 3000). Dn10 refers to the particle diameter corresponding to 10% of the number distribution of particles.

For the test of the modified graphite for specific surface area (BET), the specific surface area of a sample can be tested using a specific surface area analyzer according to GB/T 19587-2017/ISO9277: 2010 "Determination of the Specific Surface Area of Solids By Gas Adsorption Using the BET Method".

The graphitization degree of the modified graphite can be tested by using an X-ray diffractometer. The graphitization degree of a sample is tested according to JB/T 4220-2011 "Determination Method of Artificial Graphite Lattice Parameter", and the graphitization degree is g=(3.440−d002)/(3.440−3.354).

The true density of the modified graphite can be measured by using a tap density tester, and the tap density of a sample can be tested according to GB/T 5162-2006 "Metallic powders-Determination of tap density".

In addition, the secondary battery, battery module, battery pack, and power consuming device of the present application will be described below by appropriately referring to the accompanying drawings.

In one embodiment of the present application, provided is a secondary battery.

Typically, the secondary battery comprises a positive electrode piece, a negative electrode plate, an electrolyte and a separator. During the charge-discharge process of the battery, active ions move back and forth and intercalated and de-intercalated between the positive electrode piece and the negative electrode plate. The electrolyte is located between the positive electrode piece and the negative electrode plate and functions to conduct ions. The separator is provided between the positive electrode piece and the negative electrode plate, and mainly prevents the positive and negative electrodes from short-circuiting and enables ions to pass through.

[Positive Electrode Piece]

The positive electrode piece comprises a positive electrode current collector and a positive electrode film layer disposed on at least one surface of the positive electrode current collector, wherein the positive electrode film layer comprises a positive electrode material.

By way of example, the positive electrode current collector has two surfaces opposite in its own thickness direction, and the positive electrode film layer is disposed on either or both of the two opposite surfaces of the positive electrode current collector.

For the positive electrode current collector in the secondary battery of the present application, a metal foil or a composite current collector may be used. For example, as a metal foil, an aluminum foil can be used. The composite current collector may comprise a polymer material substrate layer and a metal layer formed on at least one surface of the polymer material substrate layer. The composite current collector can be formed by forming a metal material (aluminum, aluminum alloys, nickel, nickel alloys, titanium, titanium alloys, silver and silver alloys, etc.) on a polymer material substrate (substrates such as polypropylene (PP), polyethylene terephthalate (PET), polybutylene terephthalate (PBT), polystyrene (PS), and polyethylene (PE)).

In the secondary battery of the present application, positive electrode materials known in the art for batteries can be used for the positive electrode material. By way of example, the positive electrode material may include at least one of the following materials: lithium-containing phosphates with an olivine-type structure, lithium transition metal oxides, and their respective modified compounds. However, the present application is not limited to these materials, and other conventional materials that can be used as positive electrode materials for batteries can also be used. These positive electrode materials may be used either alone or as a combination of two or more. Examples of lithium transition metal oxides may include, but are not limited to, at least one of lithium cobalt oxide (e.g., $LiCoO_2$), lithium nickel oxide (e.g., $LiNiO_2$), lithium manganese oxide (e.g., $LiMnO_2$ and $LiMn_2O_4$), lithium nickel cobalt oxide, lithium manganese cobalt oxide, lithium nickel manganese oxide, lithium nickel cobalt manganese oxide (e.g., $LiNi_{1/3}Co_{1/3}Mn_{1/3}O_2$, also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$), lithium nickel cobalt aluminum oxide (e.g., $LiNi_{0.85}Co_{0.15}Al_{0.05}O_2$) and modified compounds thereof, etc. Examples of lithium-containing phosphates with an olivine structure may include, but are not limited to, at least one of lithium iron phosphate (e.g., $LiFePO_4$, also referred to as LFP), a composite material of lithium iron phosphate and carbon, lithium manganese phosphate (e.g., $LiMnPO_4$), a composite material of lithium manganese phosphate and carbon, lithium iron manganese phosphate, and a composite material of lithium iron manganese phosphate and carbon.

In the secondary battery of the present application, the positive electrode film layer further optionally comprises a binder. By way of example, the binder may include at least one of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer, and a fluorine-containing acrylate resin.

In the secondary battery of the present application, the positive electrode film layer further optionally comprises a conductive agent. By way of example, the conductive agent may include at least one of superconducting carbon, acetylene black, carbon black, Ketjen black, carbon dots, carbon nanotubes, graphene, and carbon nanofibers.

In the secondary battery of the present application, the positive electrode piece can be prepared by: dispersing the components mentioned above for preparing the positive electrode piece, such as a positive electrode material, a conductive agent, a binder and any other components, in a solvent (such as N-methylpyrrolidone) to form a positive electrode slurry; and applying the positive electrode slurry onto a positive electrode current collector, and subjecting the coated positive electrode current collector to procedures such as drying and cold pressing to obtain the positive electrode piece.

[Negative Electrode Piece]

The negative electrode piece comprises a negative electrode current collector and a negative electrode film layer disposed on at least one surface of the negative electrode current collector, wherein the negative electrode film layer comprises the modified graphite of the second aspect of the present application.

By way of example, the negative electrode current collector has two surfaces opposite in its own thickness direction, and the negative electrode film layer is disposed on either or both of the two opposite surfaces of the negative electrode current collector.

For the negative electrode current collector in the secondary battery of the present application, a metal foil or a composite current collector may be used. For example, a copper foil can be used for the metal foil. The composite current collector may comprise a polymer material substrate layer and a metal layer formed on at least one surface of the polymer material substrate. The composite current collector can be formed by forming a metal material (copper, copper alloys, nickel, nickel alloys, titanium, titanium alloys, silver and silver alloys, etc.) on a polymer material substrate (substrates such as polypropylene (PP), polyethylene terephthalate (PET), polybutylene terephthalate (PBT), polystyrene (PS), and polyethylene (PE)).

In the secondary battery of the present application, the negative electrode film layer further optionally comprises a binder. The binder may be selected from at least one of butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In the secondary battery of the present application, the negative electrode film layer further optionally comprises a conductive agent. The conductive agent may be selected from at least one of superconducting carbon, acetylene black, carbon black, Ketjen black, carbon dots, carbon nanotubes, graphene, and carbon nanofibers.

In the secondary battery of the present application, the negative electrode film layer further optionally comprises other additives, such as a thickener (e.g., sodium carboxymethylcellulose (CMC-Na)).

In the secondary battery of the present application, the negative electrode piece can be prepared by: dispersing the components mentioned above for preparing the negative electrode plate, such as a negative electrode material, a conductive agent, a binder and any other components, in a solvent (such as deionized water) to form a negative electrode slurry; and applying the negative electrode slurry onto a negative electrode current collector, and subjecting the coated negative electrode current collector to procedures such as drying and cold pressing to obtain the negative electrode plate.

[Electrolyte]

The electrolyte is located between the positive electrode piece and the negative electrode plate and functions to conduct ions. In the present application, the type of the electrolyte is not specifically limited and can be selected according to requirements. For example, the electrolyte may be in a liquid, gel or all-solid state.

In some embodiments, as the electrolyte, an electrolyte solution is used. The electrolyte solution comprises an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bis(fluorosulfonimide), lithium bis(trifluoromethane) sulfonimide, lithium triflate, lithium difluorophosphate, lithium difluoro (oxalato) borate, lithium bis (oxalato) borate, lithium difluoro bis(oxalato)phosphate and lithium tetrafluoro (oxalato)phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methyl sulfone, and ethyl sulfonyl ethane.

In some embodiments, the electrolyte solution further optionally comprises additives. For example, the additives may include negative electrode film-forming additives and positive electrode film-forming additives, and may also include additives that can improve certain properties of a battery, such as additives that improve the overcharge performance of a battery, additives that improve the high-temperature or low-temperature performance of a battery, etc.

[Separator]

Secondary batteries using electrolyte solutions and some secondary batteries using solid electrolytes further comprise separators. In the present application, the type of the separator is not particularly limited and can be selected from any well-known porous structure separator having good chemical stability and mechanical stability.

In some embodiments, the material of the separator can be selected from at least one of glass fibers, a non-woven fabric, polyethylene, polypropylene, and polyvinylidene fluoride. The separator may be a single-layer thin film or may also be a multi-layer composite thin film and is not particularly limited. When the separator is a multi-layer composite thin film, the material of each layer may be the same or different and is not particularly limited.

In some embodiments, the positive electrode piece, the negative electrode piece and the separator can be manufactured into an electrode assembly by means of a winding process or a lamination process.

In some embodiments, the secondary battery may include an outer package. The outer package can be used for encapsulating the above-mentioned electrode assembly and electrolyte.

In some embodiments, the outer package of the secondary battery may be a hard shell, such as a hard plastic shell, an aluminum shell, and a steel shell. The outer package of the secondary battery may also be a soft package, such as a pouch-type soft package. The material of the soft package may be plastic, and as the plastic, polypropylene, polybutylene terephthalate, polybutylene succinate, etc., may be listed by way of example.

Figure 3:
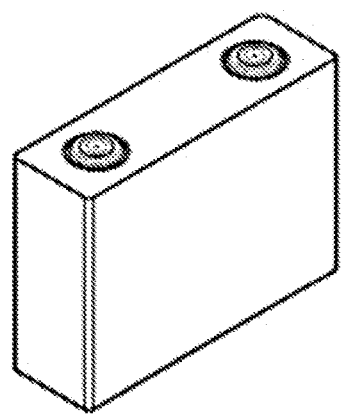
FIG. 3 is a schematic diagram of a storage battery according to an embodiment of the present application.

In the present application, the shape of the secondary battery is not particularly limited and may be cylindrical, square or any other shape. For example, FIG. 3 is an exemplary secondary battery 5 with a square structure.

Figure 4:
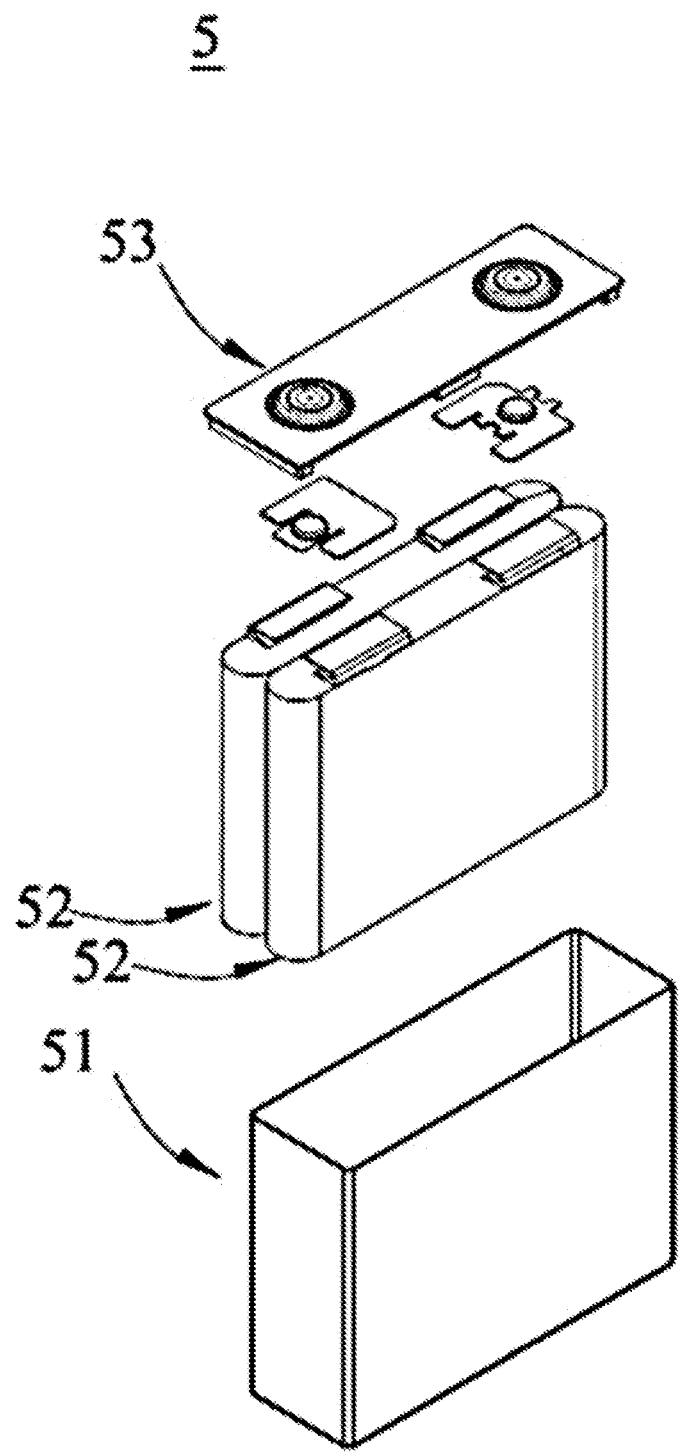
FIG. 4 is an exploded diagram of the secondary battery according to the embodiment of the present application as shown in FIG. 3.

In some embodiments, referring to FIG. 4, the outer package may include a housing 51 and a cover plate 53, wherein the housing 51 can include a bottom plate and side plates connected to the bottom plate, and the bottom plate and the side plate enclose to form an accommodating cavity. The housing 51 has an opening in communication with the accommodating cavity, and the cover plate 53 can cover the opening to close the accommodating cavity. The positive electrode piece, the negative electrode piece and the separator can be subjected to a winding process or a lamination process to form an electrode assembly 52. The electrode assembly 52 is encapsulated in the accommodating cavity. The electrolyte solution infiltrates the electrode assembly 52. The number of the electrode assemblies 52 contained in the secondary battery 5 may be one or more, and may be selected by those skilled in the art according to actual requirements.

In some embodiments, the secondary battery can be assembled into a battery module, and the number of the secondary batteries contained in the battery module can be one or more, and the specific number can be selected by those skilled in the art according to the application and capacity of the battery module.

Figure 5:
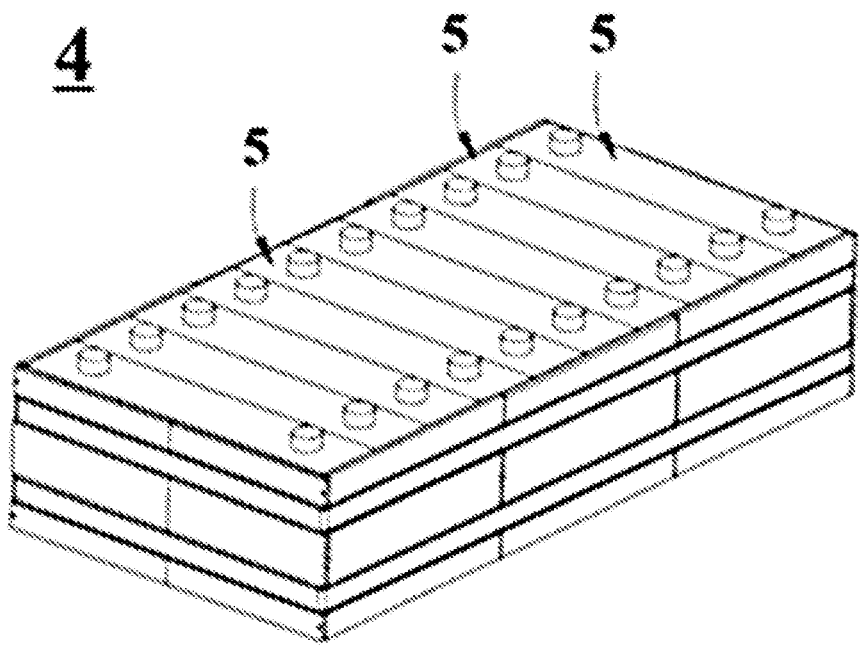
FIG. 5 is a schematic diagram of a battery module according to an embodiment of the present application.

FIG. 5 is an exemplary battery module 4. Referring to FIG. 5, in the battery module 4, a plurality of secondary batteries 5 may be disposed sequentially in the length direction of the battery module 4. Apparently, the secondary batteries can also be disposed in any other manner. Furthermore, the plurality of secondary batteries 5 can be fixed with fasteners.

Optionally, the battery module 4 may further comprise a shell having an accommodating space in which the plurality of secondary batteries 5 are accommodated.

In some embodiments, the above-mentioned battery module may also be assembled into a battery pack, the number of battery modules included in the battery pack may be one or more, and the specific number can be selected by those skilled in the art according to the application and capacity of the battery pack.

Figure 6:
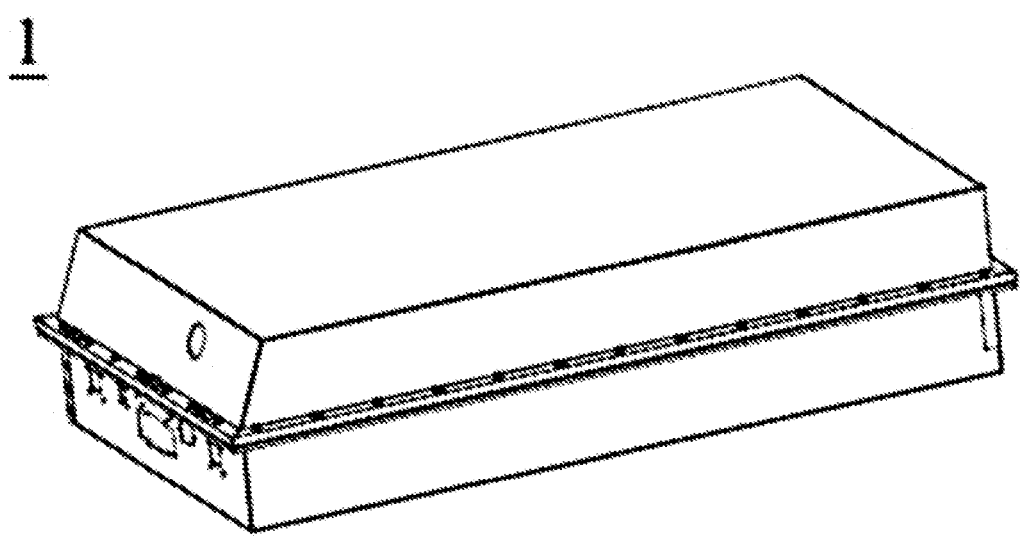
FIG. 6 is a schematic diagram of a battery pack according to an embodiment of the present application.
Figure 7:
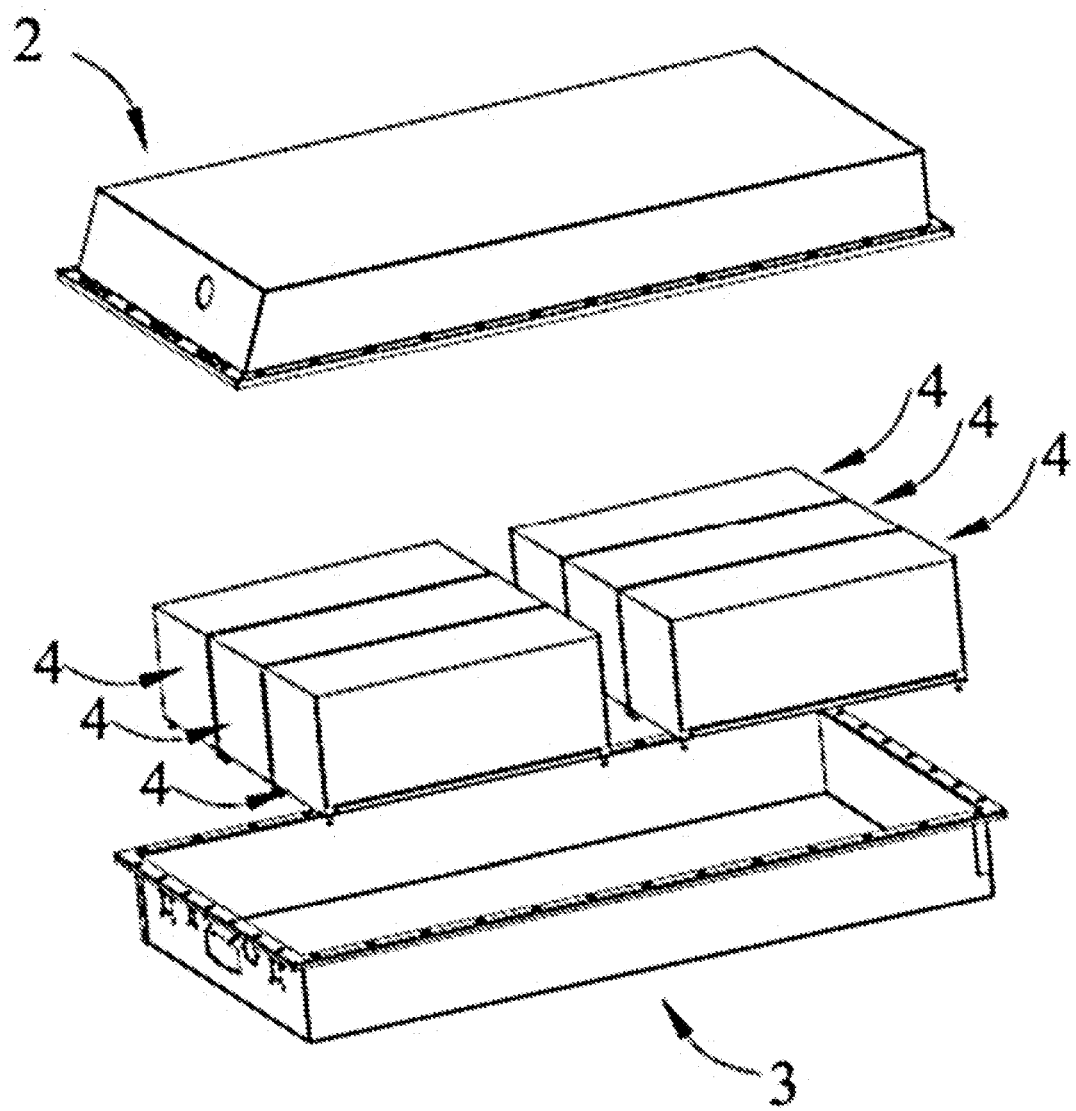
FIG. 7 is an exploded diagram of the battery pack according to the embodiment of the present application as shown in FIG. 6.

FIGS. 6 and 7 show an exemplary battery pack 1. Referring to FIGS. 6 and 7, the battery pack 1 may comprise a battery casing and a plurality of battery modules 4 arranged in the battery casing. The battery casing comprises an upper casing body 2 and a lower casing body 3, wherein the upper casing body 2 can cover the lower casing body 3 and form a closed space for accommodating the battery module 4. The plurality of battery modules 4 may be arranged in the battery casing in any manner.

In addition, the present application further provides a power consuming device. The power consuming device comprises at least one of the secondary battery, battery module, or battery pack provided by the present application. The secondary battery, battery module or battery pack may be used either as a power source of the power consuming device or as an energy storage unit for the power consuming device. The powered device can include, but is not limited to, a mobile device (such as a mobile phone and a laptop), an electric vehicle (such as an all-electric vehicle, a hybrid electric vehicle, a plug-in hybrid electric vehicle, an electric bicycle, an electric scooter, an electric golf cart, and an electric truck), an electric train, a ship, a satellite, an energy storage system, etc.

For the powered device, the secondary battery, battery module or battery pack can be selected according to the usage requirements thereof.

Figure 8:
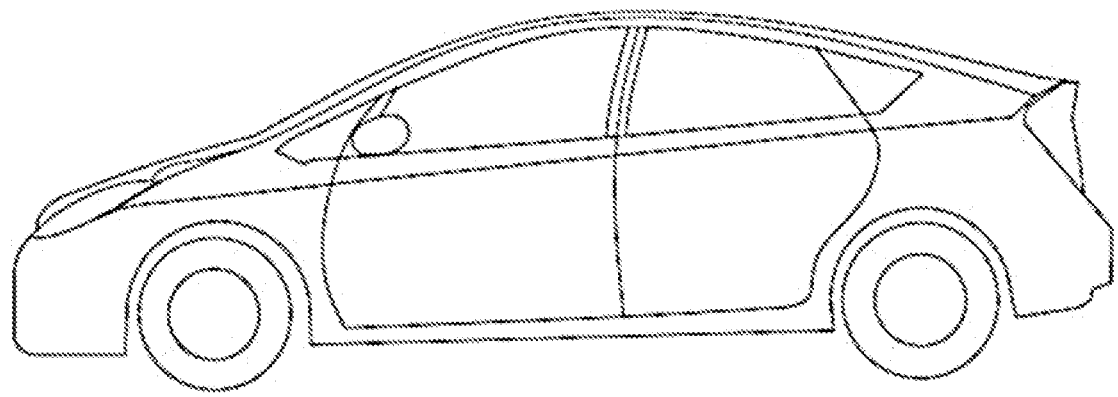
FIG. 8 is a schematic diagram of a powered device according to an embodiment of the present application in which the secondary battery is used as a power source.

FIG. 8 is an exemplary powered device. The powered device is an all-electric vehicle, a hybrid electric vehicle, or a plug-in hybrid electric vehicle, etc. In order to meet the high power and high energy density requirements of the secondary battery for the powered device, a battery pack or a battery module can be used.

As another example, the powered device may be a mobile phone, a tablet computer, a laptop, etc. The device is generally required to be thin and light, and a secondary battery can be used as a power source.

EXAMPLES

Hereinafter, the examples of the present application are explained. The examples described below are exemplary, only used to explain the present application, and should not be construed as a limitation to the present application. If no specific techniques or conditions are indicated in the examples, the techniques or conditions described in the literatures in the art or the product instructions are used. The reagents or instruments on which no manufacturer is indicated are all conventional products that are commercially available.

Example 1

A coal-based needle coke raw material is crushed by an LHJ mechanical pulverizer (manufacturer: Weifang Zhengyuan Powder Engineering Equipment Co., Ltd.). The coal-based needle coke has a sulfur content of 0.08%, an ash content of 0.05%, a volatile matter content of 5.1%, and a true density of 1.42 g/cm$^3$. The coal-based needle coke is crushed into Dv50=6-9 µm, and then classified, so as to facilitate the subsequent regulation of the particle size distribution of the resulting particulate product. The crushed coal-based needle coke is shaped by an LHV mechanical pulverizer (manufacturer: Weifang Zhengyuan Powder Engineering Equipment Co., Ltd.) with a master frequency of 8 Hz, a fine powder is removed, and the coal-based needle coke is treated until Dv50=9.8 µm. The shaped material is placed in a WHR horizontal heating reaction kettle (manufacturer: Wuxi Qingxin Fenti Shebei Youxian Gongsi) for a heat treatment that involved heating to 600° C. at 10° C./min and holding for 4 hours. The product obtained from the heat treatment is added to a graphitization furnace, and the temperature is raised to 3000° C. and held for 60 hours for high-temperature graphitization to obtain synthetic graphite. The modified graphite thus prepared has Dv50=9.0 µm, Dv10=5.4 µm, BET=1.34 m$^2$/g, a graphitization degree=95.3%, and a tap density of 1.21 g/cm$^3$.

Example 2

Except that the heat treatment temperature is adjusted to 500° C. and the particles after the shaping treatment have Dv50=11.4 µm, the other conditions are the same as in Example 1, and the modified graphite thus prepared has Dv50=10.5 µm, Dv10=5.3 µm, BET=1.35 m$^2$/g, a graphitization degree=95.1%, and a tap density of 1.18 g/cm$^3$.

Example 3

Except that the heat treatment temperature was adjusted to 400° C. and the particles after shaping treatment had Dv50=10.3 µm, the other conditions were the same as in Example 1, and the modified graphite thus prepared had Dv50=9.7 µm, Dv10=5.8 µm, BET=1.37 m$^2$/g, a graphitization degree=95.0%, and a tap density of 1.17 g/cm$^3$.

Example 4

Except that the heat treatment temperature was adjusted to 800° C. and the particles after shaping treatment had Dv50=10.0 µm, the other conditions were the same as in Example 1, and the modified graphite thus prepared had Dv50=9.5 µm, Dv10=6.1 µm, BET=1.38 m$^2$/g, a graphitization degree=95.2%, and a tap density of 1.20 g/cm$^3$.

Example 5

Except that the heat treatment time is adjusted to 6 hours and the particles after the shaping treatment have Dv50=10.8 µm, the other conditions are the same as in Example 1, and the modified graphite thus prepared has Dv50=10.2 µm, Dv10=5.4 µm, BET=1.33 m$^2$/g, a graphitization degree=95.3%, and a tap density of 1.18 g/cm$^3$.

Example 6

Except that the heat treatment time is adjusted to 2 hours and the particles after the shaping treatment have Dv50=9.4 µm, the other conditions are the same as in Example 1, and the modified graphite thus prepared has Dv50=8.8 µm, Dv10=5.1 µm, BET=1.35 m$^2$/g, a graphitization degree=95.2%, and a tap density of 1.19 g/cm$^3$.

Example 7

Except that the heat treatment time is adjusted to 8 hours and the particles after the shaping treatment have Dv50=9.7 µm, the other conditions are the same as in Example 1, and the modified graphite thus prepared has Dv50=9.1 µm, Dv10=5.5 µm, BET=1.36 m$^2$/g, a graphitization degree=95.3%, and a tap density of 1.17 g/cm$^3$.

Example 8

Except that the volatile matter content of the coal-based needle coke was adjusted to 6.4%, the sulfur content was 0.06%, the ash content was 0.03%, the quinoline-insoluble matter content was 0.07%, the true density was 1.43 g/cm$^3$, and the particles after shaping treatment had Dv50=10.1 µm, the other conditions were the same as in Example 1, and the modified graphite thus prepared had Dv50=9.5 µm, Dv10=5.1 µm, BET=1.31 m$^2$/g, a graphitization degree=95.1%, and a tap density of 1.23 g/cm$^3$.

Example 9

Except that the volatile matter content is adjusted to 6.8%, the sulfur content is 0.07%, the ash content is 0.04%, the quinoline-insoluble matter content is 0.03%, the true density is 1.36 g/cm$^3$, and the particles after the shaping treatment have Dv50=10.5 µm, the other conditions are the same as in Example 1, and the modified graphite thus prepared has Dv50=10.1 µm, Dv10=5.3 µm, BET=1.33 m$^2$/g, a graphitization degree=95.0%, and a tap density of 1.21 g/cm$^3$.

Example 10

Except that the volatile matter content is adjusted to 7.5%, the sulfur content is 0.06%, the ash content is 0.07%, the quinoline-insoluble matter content is 0.04%, the true density is 1.48 g/cm$^3$, and the particles after the shaping treatment have Dv50=9.7 µm, the other conditions are the same as in Example 1, and the modified graphite thus prepared has Dv50=9.5 µm, Dv10=5.1 µm, BET=1.31 m$^2$/g, a graphitization degree=95.1%, and a tap density of 1.25 g/cm$^3$.

Comparative Example 1

A coal-based needle coke raw material is crushed by an LHJ mechanical pulverizer (manufacturer: Weifang Zhengyuan Powder Engineering Equipment Co., Ltd.). The coal-based needle coke had a sulfur content of 0.08%, an ash content of 0.05%, a volatile matter content of 1.2%, a quinoline-insoluble matter content of 0.04%, and a true density of 1.4 g/cm$^3$. The coal-based needle coke was crushed into Dv50=6-9 µm, and then classified, so as to facilitate the subsequent regulation of the particle size distribution of the resulting particulate product. The crushed coal-based needle coke was shaped by an LHV mechanical pulverizer (manufacturer: Weifang Zhengyuan Powder Engineering Equipment Co., Ltd.) with a master frequency of 8 Hz, a fine powder was removed, and the coal-based needle coke was treated until Dv50=10.7 μm. The shaped material is placed in a WHR horizontal heating reaction kettle (manufacturer: Wuxi Qingxin Fenti Shebei Youxian Gongsi) for a heat treatment that involved heating to 600° C. at 10° C./min and holding for 4 hours. The product obtained from the heat treatment is added to a graphitization furnace, and the temperature is raised to 3000° C. and held for 60 hours for high-temperature graphitization to obtain synthetic graphite. The modified graphite thus prepared had Dv50=9.2 μm, Dv10=5.6 μm, BET=1.57 m²/g, a graphitization degree=95.2%, and a tap density of 1.13 g/cm³.

Comparative Example 2

Except that the raw material is changed to ordinary petroleum coke, the volatile matter content is adjusted to 10%, the sulfur content is 0.21%, the ash content is 0.07%, no quinoline-insoluble matter is contained, the true density is 1.45 g/cm³, and the particles after the shaping treatment have Dv50=10.2 μm, the other conditions are the same as in Comparative Example 1, and the modified graphite thus prepared has Dv50=16.5 μm, Dv10=6.8 μm, BET=1.52 m²/g, a graphitization degree=93.1%, and a tap density of 1.09 g/cm³.

Comparative Example 3

Except that the step of the heat treatment of the coal-based needle coke was canceled and the particles after shaping treatment had Dv50=9.7 μm, the other conditions were the same as in Example 1, and the modified graphite thus prepared had Dv50=9.0 μm, Dv10=5.4 μm, BET=1.61 m²/g, a graphitization degree=95.0%, and a tap density of 1.17 g/cm³.

Comparative Example 4

Except that the raw material was changed to ordinary petroleum coke, the volatile matter content was adjusted to 0.9%, the sulfur content was 0.30%, the ash content was 0.15%, the true density was 1.44 g/cm³, the heat treatment step was canceled, and the particles after shaping treatment had Dv50=10.7 μm, the other conditions were the same as in Comparative Example 2, and the modified graphite thus prepared had Dv50=10.3 μm, Dv10=6.0 μm, BET=1.49 m²/g, a graphitization degree=94.0%, and a tap density of 1.26 g/cm³.

Comparative Example 5

Except that the heat treatment temperature was adjusted to 200° C., the heat treatment time was 1 hour and the particles after shaping treatment had Dv50=9.5 μm, the other conditions were the same as in Example 1, and the modified graphite thus prepared had Dv50=8.9 μm, Dv10=5.2 μm, BET=1.53 m²/g, a graphitization degree=95.2%, and a tap density of 1.03 g/cm³.

Comparative Example 6

Except that the heat treatment time was adjusted to 1 hour and the particles after shaping treatment had Dv50=9.5 μm, the other conditions were the same as in Example 1, and the modified graphite thus prepared had Dv50=9.0 μm, Dv10=5.1 μm, BET=1.51 m²/g, a graphitization degree=95.0%, and a tap density of 1.24 g/cm³.

The relevant preparation parameters for the modified graphites of Examples 1-10 and Comparative Examples 1-6 are as shown in Table 1 below.

TABLE 1

Preparation parameters for the modified graphites of Examples 1-10 and Comparative Examples 1-6

| | Raw material type | Volatile matter [%] | Heat treatment temperature [° C.] | Heat treatment time [h] | Dv50 for particles after shaping treatment [μm] | Sulfur content [%] | Ash [%] | Quinoline-insoluble matter [%] | True density [g/cm³] |
|---|---|---|---|---|---|---|---|---|---|
| Example 1 | Coal-based needle coke | 5.1 | 600 | 4 | 9.8 | 0.08 | 0.05 | 0.05 | 1.42 |
| Example 2 | Coal-based needle coke | 5.1 | 500 | 1 | 11.4 | 0.08 | 0.05 | 0.05 | 1.42 |
| Example 3 | Coal-based needle coke | 5.1 | 400 | 4 | 10.3 | 0.08 | 0.05 | 0.05 | 1.42 |
| Example 4 | Coal-based needle coke | 5.1 | 800 | 4 | 10.0 | 0.08 | 0.05 | 0.05 | 1.42 |
| Example 5 | Coal-based needle coke | 5.1 | 600 | 6 | 10.8 | 0.08 | 0.05 | 0.05 | 1.42 |
| Example 6 | Coal-based needle coke | 5.1 | 600 | 2 | 9.4 | 0.08 | 0.05 | 0.05 | 1.42 |
| Example 7 | Coal-based needle coke | 5.1 | 600 | 8 | 9.7 | 0.08 | 0.05 | 0.05 | 1.42 |
| Example 8 | Coal-based needle coke | 6.4 | 600 | 4 | 10.1 | 0.06 | 0.03 | 0.07 | 1.43 |
| Example 9 | Coal-based needle coke | 6.8 | 600 | 4 | 10.5 | 0.07 | 0.04 | 0.03 | 1.36 |
| Example 10 | Coal-based needle coke | 7.5 | 600 | 4 | 9.7 | 0.06 | 0.07 | 0.04 | 1.48 |
| Comparative Example 1 | Coal-based needle coke | 1.2 | 600 | 4 | 10.7 | 0.06 | 0.05 | 0.04 | 1.4 |
| Comparative Example 2 | Ordinary petroleum coke | 10 | 600 | 4 | 10.2 | 0.21 | 0.07 | \ | 1.45 |
| Comparative Example 3 | Coal-based needle coke | 5.1 | \ | \ | 9.7 | 0.08 | 0.05 | 0.05 | 1.42 |
| Comparative Example 4 | Ordinary petroleum coke | 0.9 | \ | \ | 10.7 | 0.30 | 0.15 | \ | 1.44 |
| Comparative Example 5 | Coal-based needle coke | 5.1 | 200 | 1 | 9.5 | 0.08 | 0.05 | 0.05 | 1.42 |
| Comparative Example 6 | Coal-based needle coke | 5.1 | 100 | 1 | 9.5 | 0.08 | 0.05 | 0.05 | 1.42 |

The modified graphites obtained in Examples 1-10 and Comparative Examples 1-6 mentioned above are respectively subjected to an average volume particle size distribution test, a BET test, a graphitization degree test, and a tap density test. The test results are as shown in Table 2 below.

TABLE 2

Test results of the average volume particle size distribution, BET, graphitization degree, and tap density of the modified graphites of Examples 1-10 and Comparative Examples 1-6

|  | Dv50 [um] | Dv10 [um] | BET [m²/g] | Graphitization degree [%] | Tap density [g/cm³] |
|---|---|---|---|---|---|
| Example 1 | 9.0 | 5.4 | 1.34 | 95.3 | 1.21 |
| Example 2 | 10.5 | 5.3 | 1.35 | 95.1 | 1.18 |
| Example 3 | 9.7 | 5.8 | 1.37 | 95.0 | 1.17 |
| Example 4 | 9.5 | 6.1 | 1.38 | 95.2 | 1.20 |
| Example 5 | 10.2 | 5.4 | 1.33 | 95.3 | 1.18 |
| Example 6 | 8.8 | 5.1 | 1.35 | 95.2 | 1.19 |
| Example 7 | 9.1 | 5.5 | 1.36 | 95.3 | 1.18 |
| Example 8 | 9.5 | 5.1 | 1.31 | 95.1 | 1.23 |
| Example 9 | 10.1 | 5.3 | 1.33 | 95.0 | 1.21 |
| Example 10 | 9.2 | 5.6 | 1.35 | 95.3 | 1.25 |
| Comparative Example 1 | 10.1 | 5.7 | 1.57 | 95.2 | 1.13 |
| Comparative Example 2 | 16.5 | 6.8 | 1.52 | 93.1 | 1.09 |
| Comparative Example 3 | 9.0 | 5.4 | 1.61 | 95.0 | 1.17 |
| Comparative Example 4 | 10.3 | 6.0 | 1.49 | 94.0 | 1.26 |
| Comparative Example 5 | 8.9 | 5.2 | 1.53 | 95.2 | 1.03 |
| Comparative Example 6 | 9.0 | 5.1 | 1.56 | 95.0 | 1.24 |

In addition, the modified graphites obtained in Examples 1-10 and Comparative Examples 1-6 mentioned above are respectively prepared into button batteries and secondary batteries as follows, and electrochemical performance tests are carried out. The test results are as shown in Table 3 below.

(1) Preparation of Button Battery

The modified graphite, the conductive agent Super P, and the binder (PVDF) in each of the above-mentioned examples and comparative examples are mixed uniformly in the solvent NMP (N-methylpyrrolidone) at a mass ratio of 91.6:1.8:6.6 to prepare a slurry; the prepared slurry was applied on a copper foil current collector, dried in an oven, and then cold-pressed for later use, wherein the pressed density range was 1.4-1.6 g/cm³; a metal lithium sheet is taken as a counter electrode; a polyethylene (PE) thin film is used as a separator; ethylene carbonate (EC), ethyl methyl carbonate (EMC), and diethyl carbonate (DEC) are mixed at a volume ratio of 1:1:1, and $LiPF_6$ is then uniformly dissolved in the above-mentioned solution to obtain an electrolyte solution, wherein the concentration of $LiPF_6$ is 1 mol/L; and the above-mentioned components are assembled into a type CR2430 button battery in an argon glove box with argon protection.

(2) Test for Initial Gram Capacity and Initial Coulombic Efficiency of Button Battery The obtained button battery is left to stand for 12 hours, then discharged to 0.005 V at a constant current of 0.05 C using LAND CT2001A, left to stand for 10 minutes, then discharged to 0.005 V at a constant current of 50 μA, left to stand for 10 minutes, and then discharged to 0.005 V at a constant current of 10 μA, and the sum of the three discharge capacities is denoted as discharge capacity co; and constant current charging is then performed to 2.000 V at a current of 0.1 C, and the charge capacity c is recorded. The gram capacity of the prepared negative electrode material=the charge capacity c/the mass m of the negative electrode material, and the initial Coulombic efficiency=(charge capacity c/discharge capacity $c_0$)*100%.

(3) Preparation of Secondary Battery

The modified graphite in each of the above-mentioned examples and comparative examples was used as a negative electrode active material and uniformly mixed with the conductive agent acetylene black, the binder styrene-butadiene rubber (SBR) and the thickener sodium carboxymethylcellulose (CMC) in a deionized water solvent system at a weight ratio of 90:5:2:2:1 with full stirring, the mixture was applied on a copper foil, and the copper foil was dried and cold-pressed to obtain a negative electrode piece.

A positive electrode material, the conductive agent acetylene black, and the binder polyvinylidene fluoride (PVDF) were uniformly mixed in an N-methylpyrrolidone solvent system at a weight ratio of 94:3:3 with full stirring, the mixture was then applied on an aluminum foil, and the aluminum foil was dried and cold-pressed to obtain a positive electrode piece.

A porous polymeric thin film made of polyethylene (PE) is used as a separator.

The positive electrode piece, the separator and the negative electrode plate are stacked in sequence, such that the separator is placed between the positive electrode and the negative electrode and played a role of isolation, and the stack is wound to obtain a bare cell. The bare cell is placed in an outer package, the electrolyte solution used for the preparation of the above-mentioned button battery (1) is injected, and after packaging, a secondary battery is obtained.

(4) Cycling Performance Test of Secondary Battery at 45° C.

Each secondary battery prepared above is first charged to 3.65 V at ⅓ C at 25° C. (C is the nominal capacity of the battery), charged to 0.05 C at a constant voltage of 3.65 V, and then discharged to 2.5 V at ⅓ C, and the discharge capacity is recorded as $C_0$. The cycling performance of the battery is tested at 45° C. The battery is subjected to charge and discharge cycles at a rate of $1C_0/1C_0$ between 2.5 and 3.65 V. The discharge capacity of the battery at the 100th cycle is $C_{100}$, and the cycle capacity retention rate at the 100th cycle is $C_{100}/C_0$.

TABLE 3

Results of the initial gram capacity and initial Coulombic efficiency tests of the button batteries of Examples 1-10 and Comparative Examples 1-6 and the cycling performance test of the secondary batteries at 45° C.

|  | Initial gram capacity [mAh/g] | Initial Coulombic efficiency [%] | Cycling performance test at 45° C. [%] |
|---|---|---|---|
| Example 1 | 358.1 | 95.0 | 97.0 |
| Example 2 | 357.9 | 95.1 | 97.0 |
| Example 3 | 357.3 | 95.2 | 97.1 |
| Example 4 | 357.5 | 95.4 | 97.4 |
| Example 5 | 358.0 | 95.1 | 97.1 |
| Example 6 | 357.8 | 95.2 | 97.2 |
| Example 7 | 358.0 | 95.4 | 97.5 |
| Example 8 | 358.2 | 95.1 | 97.2 |
| Example 9 | 357.9 | 95.2 | 97.3 |
| Example 10 | 357.7 | 95.3 | 97.4 |
| Comparative Example 1 | 358.1 | 94.1 | 96.5 |
| Comparative Example 2 | 352.3 | 93.5 | 95.0 |
| Comparative Example 3 | 356.9 | 93.8 | 95.4 |

TABLE 3-continued

Results of the initial gram capacity and initial Coulombic efficiency tests of the button batteries of Examples 1-10 and Comparative Examples 1-6 and the cycling performance test of the secondary batteries at 45° C.

| | Initial gram capacity [mAh/g] | Initial Coulombic efficiency [%] | Cycling performance test at 45° C. [%] |
|---|---|---|---|
| Comparative Example 4 | 355.1 | 93.9 | 96.1 |
| Comparative Example 5 | 357.7 | 93.4 | 94.8 |
| Comparative Example 6 | 357.9 | 93.6 | 94.8 |

Figure 2:
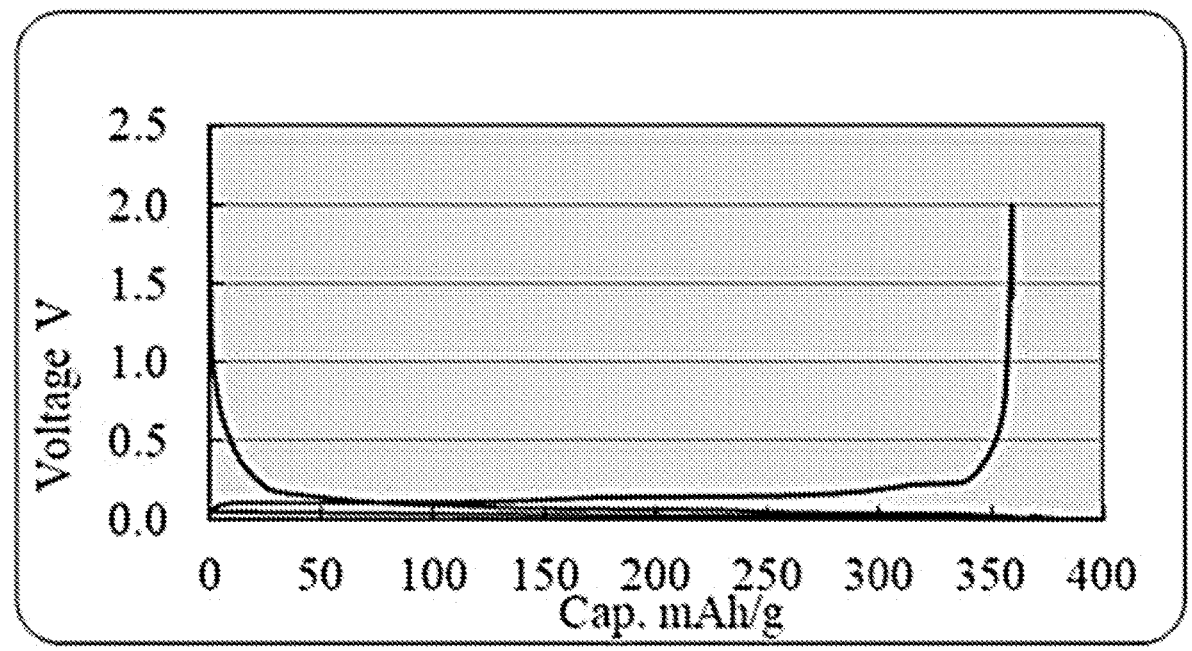
FIG. 2 is a first charge and discharge diagram of Example 1 of the present application.

According to the above results, it can be seen that the modified graphites prepared in Examples 1-10 by using the volatile components contained in the coal-based needle coke itself as a coating agent, without additionally adding a coating agent, has a coating layer, and therefore, good effects are achieved in improving the surface roughness of the particles and reducing the consumption of active lithium in the electrolyte solution; in addition, the electrochemical performance of the prepared modified graphite is also accordingly improved. As shown in FIG. 2, FIG. 2 is a first charge and discharge diagram of the modified graphite of Example 1 of the present application. The modified graphite of Example 1 exhibited excellent electrochemical performance, that is, the gram capacity of the first discharge is 376.9 mAh/g, the gram capacity of the first charge is 358.1 mAh/g, and the initial Coulombic efficiency is 95.0%. In general, the initial Coulombic efficiencies of the modified graphites in Examples 1-10 are all more than or equal to 95.0%, and the capacity retention rates after 100 cycles at 45° C. are all more than 97.0%.

In contrast, in Comparative Example 1, under the same heat treatment process conditions as in Example 1, due to the relatively low volatile matter content of the coal-based needle coke and the fact that the volatile matter could not fully and uniformly coat the particle surface, the coating layer could not fully improve the interfacial properties of graphite, so the initial Coulombic efficiency of the prepared modified graphite is relatively low. Compared with Examples 1-10, in both Comparative Examples 2 and 4, ordinary petroleum coke is used as a raw material. In Comparative Example 2, a bonding effect occurred during the heat treatment of ordinary petroleum coke, resulting in particle agglomeration, leading to a failure in effectively improving the initial Coulombic efficiency of the prepared modified graphite. In Comparative Example 4, since the volatile matter content of ordinary petroleum coke is relatively low and the heat treatment process therefor is canceled, the obtained modified graphite has no coating layer and defects remained on the particle surface. Therefore, the effect of reducing the consumption of active lithium and improving the initial Coulombic efficiency is not good.

The differences between Comparative Examples 3, 5 and 6 and Example 1 mainly lay in the heat treatment temperature and heat treatment time. In Comparative Example 3, since the heat treatment of the coal-based needle coke is canceled, the volatile matter could not uniformly coat the particle surface to form a coating layer, and since the interfacial properties of the obtained modified graphite could not be improved, the cycling performance and initial Coulombic efficiency thereof are both inferior to those of the modified graphite in Examples 1-10. In Comparative Example 5, since the heat treatment temperature is relatively low, the volatile matter could not be fully enriched on the particle surface, and since the heat treatment time is relatively short, the volatile components could not form a complete core-shell structure to improve the particle surface. Therefore, the effect of improving the interfacial properties and electrochemical performance of graphite is not good. In Comparative Example 6, since the heat treatment time for the coal-based needle coke is relatively short, no coating layer could be formed on the particle surface to reduce side reactions between the modified graphite and the electrolyte solution. Therefore, the effect of improving the electrochemical performance and interfacial properties of the prepared modified graphite is limited.

In addition, in Table 2, it can be seen from Comparative Examples 1-10 and Comparative Examples 1-6 that the BETs of the modified graphites in Examples 1-10 are all smaller than the BETs of the modified graphites in Comparative Examples 1-6. When the modified graphite is used as a negative electrode material for a secondary battery, the BET thereof is related to the initial Coulombic efficiency thereof. For example, the larger the BET, the easier the negative electrode material is to react with the electrolyte solution and consume active lithium, thus affecting the cycling performance of the negative electrode material. Therefore, the modified graphites in Examples 1-10 has smaller BETs than the modified graphites in Comparative Examples 1-6, meaning that the modified graphites in Examples 1-10 has better initial Coulombic efficiencies as negative electrode materials. The data in Table 3 also fully demonstrated this. In addition, the modified graphites in Examples 1-10 has larger tap densities than the modified graphites in Comparative Examples 1-6. The negative electrode material with a high tap density also ensured the energy density of the secondary battery as a whole.

It should be noted that the present application is not limited to the above-mentioned embodiments. The above-described embodiments are merely exemplary, and embodiments having substantively the same composition as the technical idea and exerting the same effects within the scope of the technical solution of the present application are all included in the technical scope of the present application. In addition, without departing from the gist of the present application, various modifications that can be conceived by those skilled in the art and applied to the embodiments, and other modes constructed by combining some of the components in the embodiments are also included in the scope of the present application.

The invention claimed is:

1. A method for preparing a modified graphite, comprising:
    performing crushing on coal-based needle coke to obtain a first material;
    performing shaping fine powder removal on the first material to obtain a second material;
    performing heat treatment on the second material in a reaction kettle and then cooling the second material after the heat treatment to room temperature to obtain a third material; and
    performing graphitization on the third material in a graphitization furnace and then cooling the third material after the graphitization to room temperature to obtain the modified graphite;
    wherein:
        the coal-based needle coke comprises, in mass percentages, a volatile matter content of 5-9%, a sulfur content of less than or equal to 0.2%, an ash content of less than or equal to 0.2%, and a quinoline-insoluble matter content of less than or equal to 0.2%; and the coal-based needle coke has a true density of 1.35-1.48 g/cm$^3$.

2. The method according to claim 1, wherein the heat treatment is performed at a temperature of 400-800° C. for 2-8 hours.

3. The method according to claim 1, wherein the heat treatment is performed at a temperature increase rate of 1-15° C./min.

4. The method according to claim 1, wherein the graphitization is performed at a temperature of 2500-3200° C. for 55-65 hours.

5. The method according to claim 1, wherein Dv50 and Dn10 of the second material satisfy:

Dv50=5-12 μm; and

5 μm≥Dn10≥1.5 μm.

6. The method according to claim 1, wherein Dv50 of the first material satisfies: Dv50=3-12 μm.

* * * * *